United States Patent [19]

Lee

[11] Patent Number: 5,646,215
[45] Date of Patent: Jul. 8, 1997

[54] POLYBUTYLENE CONTAINING REACTIVE UNSATURATED FUNCTIONALITY

[75] Inventor: Kenneth Michael Lee, Bay City, Mich.

[73] Assignee: Dow Corning Corporation, Midland, Mich.

[21] Appl. No.: 740,573

[22] Filed: Oct. 31, 1996

[51] Int. Cl.⁶ .............................. C08L 73/02; C08L 71/02
[52] U.S. Cl. .................. 525/285; 525/298; 525/327.4; 525/333.7; 525/326.1; 525/384; 526/271; 526/272; 526/348.7; 528/271; 528/405; 528/486; 549/231; 549/233; 549/255
[58] Field of Search .................. 549/255, 231, 549/233; 526/348.7, 271, 272; 528/405, 486, 271; 525/285, 298, 327.4, 333.7, 326.1, 384

[56] References Cited

U.S. PATENT DOCUMENTS

| | | | |
|---|---|---|---|
| 4,414,397 | 11/1983 | Powell | 549/255 |
| 4,665,127 | 5/1987 | Hirose | 525/100 |
| 4,808,664 | 2/1989 | Saam | 525/106 |
| 4,900,772 | 2/1990 | Imanaka | 524/303 |
| 4,904,732 | 2/1990 | Iwahara | 525/100 |

FOREIGN PATENT DOCUMENTS

| | | |
|---|---|---|
| 59-6219 | 1/1984 | Japan . |
| 63-199277 | 8/1988 | Japan . |
| 7-102017 | 4/1995 | Japan . |
| 1490240 | 10/1977 | United Kingdom . |

*Primary Examiner*—W. Robinson H. Clark
*Attorney, Agent, or Firm*—Alexander Weitz

[57] ABSTRACT

The invention relates to a functionalized polybutylene polymer which contains at least one unsaturated group in its molecule, said functionalized polybutylene being prepared by reacting (A) an anhydride-functional polybutylene with (B) an allyl-functional compound having at least one hydroxyl-containing group in its molecule.

16 Claims, No Drawings

POLYBUTYLENE CONTAINING REACTIVE UNSATURATED FUNCTIONALITY

FIELD OF THE INVENTION

The present invention relates to a functional polybutylenes which contain at least one reactive unsaturated group. More particularly, the invention relates to a polybutylene prepared by reacting an anhydride-functional polybutylene with an unsaturated organic compound selected having 3 to 12 carbon atoms, said unsaturated organic compound also having at least one hydroxyl-containing group in its molecule.

BACKGROUND OF THE INVENTION

Hydrocarbon polymers which contain reactive functional groups are known in the art. For example, Japanese (Kokai) 7-102017 to Kanegafuchi Chemical Industry discloses the preparation of various polymers having terminal unsaturation by reacting of the corresponding hydroxyl-terminated polymer with a compound selected from an allyl halide, an acrylic acid, an oxirane ring-containing compound having carbon-carbon double bonds or a compound containing an isocyanate group and carbon-carbon double bonds in its molecule. The starting polymer, which must contain at least 1.1 hydroxyl groups per molecule, can be prepared from by a chain scission of the hydrocarbon polymer chain by reaction with ozone followed by reduction with lithium aluminum hydride, for example. This method for producing the hydroxy-functional precursor polymer has a disadvantage in that the chain scission results in a reduction of polymer molecular weight, as observed in Reference Example 1 of the above mentioned Kanegafuchi publication. In such a procedure, the molecular weight distribution can also be broadened.

Further, polyisobutylenes which have 2-methyl-1-propenyl end groups of the formula —HC=C(CH$_3$)$_2$ are available commercially. However, this type of unsaturation is not amenable to hydrosilation addition reactions with SiH-functional compounds such as silanes and siloxanes. These end groups are also hard to polymerize by free radicals. Thus, the low reactivity detracts from the utility of these commercial polyisobutylenes in certain applications where copolymerization or modification with silicon-containing species is desired.

There is therefore a need for polyisobutylene polymers and oligomers which contain unsaturated groups having improved reactivity with SiH-functional compounds and/or are more reactive in free radical systems.

SUMMARY OF THE INVENTION

It has now been discovered that an anhydride functional polybutylene can be reacted with an unsaturated organic compound which also contains a hydroxyl group in its molecule to form a polybutylene which contains the unsaturated group having improved reactivity with respect to silylation and free-radical systems.

The present invention, therefore, relates to a functionalized polybutylene polymer or oligomer which contains at least one unsaturated group in its molecule, said functionalized polybutylene being prepared by reacting (A) an anhydride-functional polybutylene with (B) an allyl-functional compound having at least one hydroxyl-containing group in its molecule.

The invention also relates to a method for preparing the functionalized polybutylene comprising reacting said components (A) and (B).

DETAILED DESCRIPTION OF THE INVENTION

According to the present invention, the functionalized polybutylene is prepared from an anhydride-functional polybutylene (A). For the purposes of the invention, component (A) is a polybutylene (PB) polymer or oligomer having at least one anhydride-containing group along its chain or at its end(s). A preferred anhydride-functional PB contains one anhydride group per molecule and has the formula

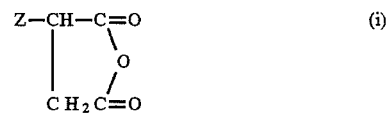

wherein Z represents a polymer (or oligomer) chain consisting essentially of butylene repeat units. The polybutylene chain which can comprise repeat units having the following formulas

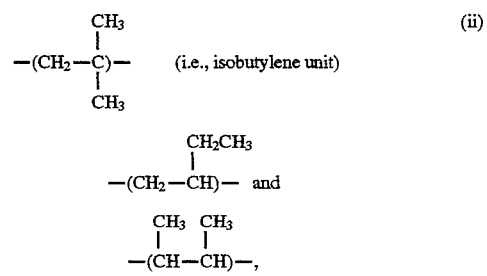

as well as rearranged products such as

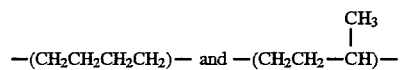

The preferred component (A) is an oligomer or polymer wherein a predominant proportion of the repeat units are isobutylene units (i.e., formula (ii)) and which has a number average molecular weight of 200 to 200,000, preferably 200 to 2,000.

Polybutylene (A) is known in the art and may be prepared, e.g., by heating an unsaturated PB with maleic anhydride. The above mentioned unsaturated PB is available commercially in a variety of molecular weights from, e.g., the Amoco Chemical Company (Chicago, Ill.) under the trade name Indopol™, from BASF Aktiengesellschaft (Germany) under the trade name Gtissopal™ and from BP Chemicals Limited (London) under the trade name Ultravis™. In general, when the unsaturated PB is reacted with maleic anhydride, a portion (e.g., 30% or less) of the polymer remains unfunctionalized with anhydride, such incompletely functionalized products being suitable for applications contemplated herein. Efforts to reduce the unfunctionalized polymer content have been the object of process improvement patents, such as U.S. Pat. No. 4,110,349 to Cohen, which teaches the use of chlorine to increase conversion. It is preferred that component (A) contains at least one anhydride group per molecule.

Component (B) of the invention is an organic compound having at least one allyl group and at least one hydroxyl-containing group in its molecule. For the purposes of the present invention, the allyl functionality is either connected directly to a hydroxyl group or it is attached thereto through an organic connecting group. The nature of this connecting group is not critical to the invention provided that it does not interfere with the reaction of the anhydride functionality of component (A) with the hydroxyl functionality of component (B) and that it is chemically inert with respect to the allyl functionality of (B). Preferably, component (B) has a formula selected from

HO—Q—CH$_2$CH=CH$_2$  (iii) or

HO—CH$_2$CH=CH$_2$ (i.e., allyl alcohol)  (iv)

wherein divalent group Q represents the above mentioned organic connecting group and contains at least one carbon atom.

In one preferred embodiment of the invention, the connecting group Q of formula (iii) is a branched or linear alkylene group having 1 to 12 carbon atoms, such as methylene, ethylene, propylene, isopropylene, butylene, isobutylene, 2-ethylhexylene, octylene, decylene, undecylene and dodecylene.

In another preferred embodiment, connecting group Q of formula (iii) is a divalent group which comprises one or more alkylene oxide units. In this case, the allyl-functional compound has the formula HO—(C$_x$H$_{2x}$O)$_y$CH$_2$CH=CH$_2$  (v)

in which x is an integer having a value of 2 to 4 and y has an average value of 1 or greater (i.e., this connecting group can itself be polymeric). Preferably y is 1 to 100. In formula (v), the value of x is independent for each alkylene oxide unit and it is preferred that the alkylene oxide portion of formula (v) is a polymer consisting of ethylene oxide (EO) units, a polymer consisting of propylene oxide (PO) units, a polymer consisting of butylene oxide (BO) units or a copolymer of EO, PO and BO units in any combination.

The above mentioned allyl-functional compounds are well known in the art and further description thereof is not considered necessary herein.

In the method of the present invention, about one equivalent of component (A) is preferably reacted with one equivalent of component (B) to produce an allyl-functional polybutylene having an ester connecting group disposed between the polybutylene chain and the allyl group. The remaining functionality resulting from this reaction is a carboxylic acid group such that this product may be called a half ester, half acid. This reaction is quite facile at temperatures of about 70° to 150° C., preferably 90° to 120° C., and may be carried out by heating a mixture of the neat components or heating a solution of these components in an organic solvent such as toluene or hexane in order to improve compatibility therebetween. Typically, a small quantity of a basic compound, preferably a tertiary amine such as pyridine, is also added to promote the reaction between the hydroxyl group of component (B) and the anhydride group of component (A). Thus, for example, when component (B) is represented by formula (iii) and the anhydride-functional PB is represented by formula (i), the resulting product of the invention may be represented by formulas (vi) and (vii)

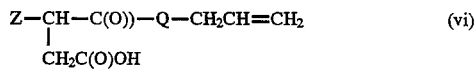

Z—CH—C(O))—Q—CH$_2$CH=CH$_2$   (vi)
    |
    CH$_2$C(O)OH and

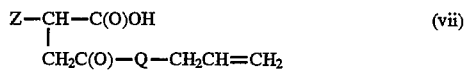

Z—CH—C(O)OH   (vii)
    |
    CH$_2$C(O)—Q—CH$_2$CH=CH$_2$ wherein Z and Q are as defined above. Those skilled in the art will, of course, recognize that a mixture of the above two products is obtained since the hydroxyl group of component (B) attacks alternative sides of the anhydride ring of component (A). The polybutylenes containing reactive unsaturated groups according to the invention find utility as intermediates for the preparation of copolymers and as modifiers for siloxane polymeric systems (e.g., for the control of modulus or barrier properties in sealant and adhesive applications).

EXAMPLES

The following examples are presented to further illustrate the compositions of the invention, but are not to be construed as limiting the invention, which is delineated in the appended claims. All parts and percentages in the examples are on a weight basis and all measurements were obtained at 21° C., unless indicated to the contrary.

Example 1

Anhydride-functional polybutylene (NBP 1050) was obtained from Nelson Brothers Corp. (Birmingham, Ala.). This polymer is described as a polyisobutylene in which approximately 70% of the chains have been modified by incorporation of an anhydride group of the formula

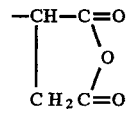

This anhydride-functional PB has a number average molecular weight of about 1,100 and an acid number of about 51–53. The anhydride-functional PB (21.8 g) was mixed with 6.2 g of an allyl-functional poly(ethylene oxide) having the formula HO—(C$_2$H$_4$O)a$_y$—CH$_2$CH=CH$_2$ wherein the average value of y is about 7. This mixture was heated for 4.6 hours at 86°–95° C. The mixture, which was initially hazy, was now a clear, single phase and infrared (IR) analysis indicated that some anhydride functionality remained. One drop of pyridine was added and the combination was stirred and heated at 105°–115° C. for 3 hours. Infrared analysis indicated the disappearance of anhydride carbonyl absorption (1863 and 1786 cm$^{-1}$) and the formation of ester links (1735 cm$^{-1}$) as well as carboxyl groups (1710 cm$^{-1}$); IR also indicated that olefinic groups (1642 cm$^{-1}$) were present throughout the preparation. The resulting product had a refractive index of 1.4918 and the above analysis was consistent with above structures (ix) and (x), wherein Q is —(C₂H₄O)ᵧ— and y has an average value of 7.

Example 2

The anhydride-functional PB used in Example 1 (11.0 g; 0.01 mole), allyl alcohol (0.55 g; 0.0095 mole), 2 g of toluene and 0.055 g of pyridine were combined and heated at 90° C. for 5 hours. During this time, the infrared absorbances due to anhydride, 1863 and 1786 cm⁻¹, disappeared and new absorbances for ester at 1739 cm⁻¹ and carboxyl at 1710 cm⁻¹ appeared. The absorbance for olefin at 1648 cm⁻¹ was maintained. The product was devolatilized at 80° C. and 1 mm of Hg, resulting in a product having a refractive index of 1.4965.

Example 3

The anhydride-functional PB used in Example 1 (11.0 g; 0.01 mole), allyloxypropanol (2.5 g; 0.01 mole of a mixture of oligomers having 1, 2, 3 and 4 propoxy units), 2.0 g of toluene and 0.058 g of pyridine were combined and heated for 14 hours at 90° C. During this time most of the anhydride absorbances in the infrared at 1863 and 1786 cm⁻¹ disappeared and new absorbances for ester at 1732 cm⁻¹ and carboxyl at 1711 cm⁻¹ appeared. Olefin at 1646 cm⁻¹ was maintained. The material was stripped at 80° C. and 1 mm of Hg, resulting in a product having a refractive index of 1.4968.

Example 4

The anhydride-functional PB used in Example 1 (11.0 g; 0.01 mole), trimethylolpropane diallyl ether (2.14 g; 0.01 mole) and 0.048 g of pyridine were combined and heated at 92° C. for 12 hours. Most of the anhydride absorbances in the infrared at 1863 and 1786 cm⁻¹ disappeared and new absorbances appeared for ester at 1738 cm⁻¹ and carboxyl at 1710 cm⁻¹ Olefin absorbances at 1646 cm⁻¹ and olefinic CH at 3079 cm⁻¹ were maintained. The final product had a refractive index of 1.4942.

Example 5

The anhydride-functional PB used in Example 1 (11.0 g; 0.01 mole), 10-undecen-1-ol (1.70 g; 0.01 mole) and 0.046 g of pyridine were combined and heated at 92° C. for 5.5 hours. During this time, the infrared absorbances for anhydride at 1863 and 1786 cm⁻¹ disappeared and absorbances for ester at 1739 cm⁻¹ and carboxyl at 1711 cm⁻¹ appeared. Olefin absorption at 1641 cm⁻¹ and olefinic CH at 3076 cm⁻¹ were maintained. The resulting product had a refractive index of 1.4935.

That which is claimed is:

1. A functionalized polybutylene prepared by reacting (A) an anhydride-functional polybutylene with (B) an allyl-functional compound having at least one hydroxyl-containing group in its molecule.

2. The functionalized polybutylene according to claim 1, wherein said anhydride-functional polybutylene has the formula

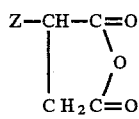

in which Z is a polybutylene chain.

3. The functionalized polybutylene according to claim 1, wherein said allyl-functional compound (B) has a formula selected from the group consisting of HO—Q—CH₂CH=CH₂ and HO—CH₂CH=CH₂ in which Q is an alkylene group having 1 to 12 carbon atoms.

4. The functionalized polybutylene according to claim 1, wherein said allyl-functional compound (B) has the formula

HO—(CH₂ₓO)ᵧCH₂CH=CH₂ in which x is an integer having a value of 2 to 4 and y has an average value of at least 1.

5. The functionalized polybutylene according to claim 1, wherein said allyl-functional compound (B) has the formula

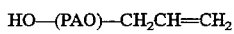

HO—(PAO)—CH₂CH=CH₂ in which PAO represents a polyalkylene oxide chain comprising at least one repeat unit selected from the group consisting of ethylene oxide, propylene oxide and butylene oxide.

6. The functionalized polybutylene according to claim 3, wherein said anhydride-functional polybutylene has the formula

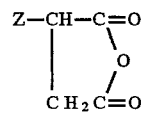

in which Z is a polybutylene chain.

7. The functionalized polybutylene according to claim 4, wherein said anhydride-functional polybutylene has the formula

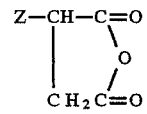

in which Z is a polybutylene chain.

8. The functionalized polybutylene according to claim 5, wherein said anhydride-functional polybutylene has the formula

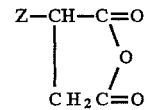

in which Z is a polybutylene chain.

9. A method for preparing a functionalized polybutylene comprising reacting (A) an anhydride-functional polybutylene with (B) an allyl-functional compound having at least one hydroxyl-containing group in its molecule.

10. The method according to claim 9, wherein said anhydride-functional polybutylene has the formula

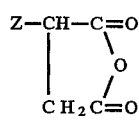

in which Z is a polybutylene chain.

11. The method according to claim 9, wherein said allyl-functional compound (B) has a formula selected from the group consisting of HO—Q—CH₂CH=CH₂ and HO—CH₂CH=CH₂ in which Q is an alkylene group having 1 to 12 carbon atoms.

12. The method according to claim 9, wherein said allyl-functional compound (B) has the formula

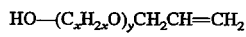

in which x is an integer having a value of 2 to 4 and y has an average value of at least 1.

13. The method according to claim 9, wherein said allyl-functional compound (B) has the formula

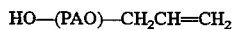

in which PAO represents a polyalkylene oxide chain comprising at least one repeat unit selected from the group consisting of ethylene oxide, propylene oxide and butylene oxide.

14. The method according to claim 11, wherein said anhydride-functional polybutylene has the formula

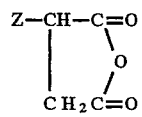

in which Z is a polybutylene chain.

15. The method according to claim 12, wherein said anhydride-functional polybutylene has the formula

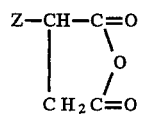

in which Z is a polybutylene chain.

16. The method according to claim 13, wherein said anhydride-functional polybutylene has the formula

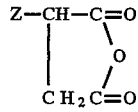

in which Z is a polybutylene chain.

* * * * *